United States Patent [19]
Macko et al.

[11] 3,840,799
[45] Oct. 8, 1974

[54] COMMUTATORLESS DC MOTOR DRIVE ARRANGEMENT

[75] Inventors: Joseph E. Macko, Irwin; Brian R. Pelly, Murrysville; John Rosa, Pittsburgh, all of Pa.

[73] Assignee: Westinghouse Electric Corporation, Pittsburgh, Pa.

[22] Filed: Sept. 11, 1973

[21] Appl. No.: 396,165

[52] U.S. Cl. ............... 321/5, 318/171, 318/189, 318/345, 321/18, 321/45 S
[51] Int. Cl. ............................................. H02m 7/00
[58] Field of Search .......... 318/171, 189, 227, 345; 321/5, 18, 45 S

[56] References Cited
UNITED STATES PATENTS

| | | | |
|---|---|---|---|
| 3,364,408 | 1/1968 | Katz et al. | 321/45 S |
| 3,458,796 | 7/1969 | Cassady | 321/45 S |
| 3,546,551 | 12/1970 | Risberg et al. | 318/227 |
| 3,593,103 | 7/1971 | Chandler | 318/345 X |
| 3,670,224 | 6/1972 | Jensen | 318/345 X |
| 3,671,831 | 6/1972 | Chausse et al. | 318/227 |
| 3,761,796 | 9/1973 | Jensen | 318/227 X |
| 3,767,988 | 10/1973 | Jensen | 318/227 |
| 3,769,564 | 10/1973 | Rettig | 318/227 |
| 3,769,568 | 10/1973 | Hamilton et al. | 321/45 S |
| 3,781,641 | 12/1973 | Rettig | 318/227 X |

*Primary Examiner*—William M. Shoop, Jr.
*Attorney, Agent, or Firm*—J. J. Wood

[57] ABSTRACT

A commutatorless DC motor drive arrangement, in which an inverter is utilized to feed a synchronous AC motor, is provided with an all electrical speed control that eliminates the need for a motor shaft position sensor. The rate at which firing pulses are applied to the inverter, and hence the speed at which the synchronous motor is driven by the inverter output, is made dependent upon the magnitude of the applied DC voltage. Upon start-up of the drive arrangement, the applied DC voltage is made to increase in a linear fashion in order to provide gradual buildup of the motor speed. In order to ensure natural commutation of the inverter, an automatic trial-and-error method is utilized to determine that the inverter is started in the desired leading power factor mode of operation.

13 Claims, 13 Drawing Figures

COMMUTATORLESS DC MOTOR DRIVE ARRANGEMENT

BACKGROUND OF THE INVENTION

1. Field of the Invention

This invention relates generally to a drive arrangement of the type known as a commutatorless DC motor, and more specifically, this invention relates to a commutatorless DC motor drive arrangement for an air conditioner compressor in which an all-electrical system is utilized to control motor speed without the use of a motor shaft position sensor.

2. Description of the Prior Art

Conventional centrifugal air conditioning compressors use a 60 Hz induction motor to drive a high-speed impeller through a step-up gear box. With this arrangement, pre-rotation vanes are closed (for minimum gas loading during start-up) prior to system start-up. As the induction motor starts, undesirable large surge currents, typical of induction motors, are produced in the AC input lines. The motor reaches maximum speed (about 3,600 rpm for a two-pole machine on a 60 Hz line), and the gear box drives the impeller at a high speed (i.e., typically 31,000 rpm in a 130 ton system). At this point, the pre-rotation vanes are opened, via a vane control operated from the system load control, to the desired load position. Freon entering at a first pressure is compressed by the high-speed impeller and leaves the pump at a higher second pressure. The compressed Freon then enters a condenser where it is cooled and sent to the evaporator, or water chiller, and then directed back to the pump input. The system employs a hermetically sealed motor gear box which uses a Freon-oil mixture to lubricate the gears and the four bearings associated with the compressor.

One type of system that could be utilized to overcome the disadvantages of the 60 Hz induction motor drive would be the use of a high-speed AC motor, energized from a static high frequency source, to drive the impeller directly. Such an arrangement exists in the prior art and employs as primary components a solid state inverter (frequently known as a "static commutator" in this context), a standard three-phase synchronous motor, and a motor shaft position sensor to provide gate signals to the static commutator.

The inverter is essentially a three-phase bridge of thyristors with an input filter choke. In order to take advantage of the available line-to-line back emf from the motor, the inverter commonly operates at a leading power factor to permit natural or line commutation of the inverter thyristors. Such a leading power factor is obtained by adjusting the position sensor pickup devices so that the inverter thyristors are fired at the appropriate instances to produce a leading power factor. If the torque requirement at low speed is relatively small, such as is the case, for example, with a fan type load such as a centrifugal compressor, then the current to be commutated at low speed is also relatively small, and natural commutation can be employed over the whole speed range. If, on the other hand, it is required to deliver full load torque over the whole speed range, then natural commutation can be used only from some minimum speed upwards. Below this minimum speed, the voltage induced in the machine is insufficient to commutate the full load current and forced commutation must be utilized.

A position sensor may be provided by utilizing a mechanical device with low current brushes and a single copper segment on a rotating disc. However, in order to avoid mechanical contacts, the sensing may also be done by using a shaft mounted rotating magnet with Hall detectors, or reluctance switches, as the stator. Another possibility would be to utilize photosensitive detectors on the stator and an optical rotor. Of course, other types of position sensing arrangements could also be utilized.

In another type of prior art device, a "hybrid" arrangement is utilized. In this hybrid arrangement, the shaft position sensor is employed to get the motor running, but after the motor reaches a certain speed the timing of the inverter firing pulses is kept in synchronism with motor shaft position by using information obtained from the voltages appearing across the machine windings. This latter approach cannot be utilized at all speeds, as it has been found that a shaft position sensor is necessary for operation below a certain minimum speed for the following reasons: (1) At standstill, it is necessary to know the position of the rotor in order to determine which pair among the six thyristors should be fired. If the wrong pair is switched on, the resulting torque could be insufficient, or it could even be in the incorrect direction. (Note, however, that this latter condition is only temporary, as the direction of rotation is ultimately determined only by the phase sequence of the firing pulses applied to the thyristors.) (2) Even if the correct pair of thyristors is fired initially, so that the motor immediately starts to rotate in the proper direction, the amplitude of the resulting voltage induced in the machine initially is so small that the required position information cannot be extracted.

Although these prior art devices provide desirable alternatives to the present induction motor certrifugal compressor drive, they are relatively large and complex and involve expenses that would be desirable to reduce. In addition, a system utilizing a position sensor to control gating of the inverter thyristors and the system based upon utilization of the voltages appearing across the machine windings (which also, of course, requires the use of a position sensor for low speeds) involve motor speed changes with variations in the load. In the case of the position sensor system, the machine speed falls quite markedly with load (due to the effect of phase shift of the motor terminal voltage with respect to rotor position). In the case of the system utilizing the voltages induced in the machine windings, the machine speed typically falls initially with increasing load and then increases due to the effect of armature reaction.

SUMMARY OF THE INVENTION

The present invention obviates the disadvantages of the prior art commutatorless direct current (DC) motor systems and thus provides an improved commutatorless DC motor drive arrangement. In this arrangement an inverter circuit, having selectively actuatable switching devices such as six thyristors forming three series connected pairs, are utilized to provide electrical energy to the armature windings of a three-phase synchronous motor. Of course, a single-phase motor or a poly-phase motor having other than three phases could also be utilized. In the case of a three-phase motor, each of the armature windings is connected to the midpoint of an associated pair of thyristors.

DC voltage for the inverter circuit is obtained from a source of controlable DC voltage, such as a semiconverter utilized to convert power from an alternating current (AC) source to the requisite DC voltage. A smoothing inductor is located in at least one of the DC lines between the semiconverter and the inverter.

A control circuit is utilized to produce timing pulses and have a repetition rate or frequency that provides a constant volt-time interval regardless of the magnitude of the DC voltage applied to the inverter. This control circuit has an integrator circuit that integrates the DC voltage appearing across the inverter DC terminals. The output of the integrator is applied to an integrator comparator circuit, to which is also applied an integrator reference level signal produced by an appropriate integrator reference source. The integrator reference level signal represents the desired constant volt-time integral. When the integrator comparator determines that the integrator output has reached the level of the integrator reference level signal, a timing pulse is produced. This timing pulse, which is one of a series of pulses, is applied to a firing pulse circuit which produces firing pulses to be applied to the gates of selected thyristors in the inverter circuit. At the same time, this timing pulse is fed back to the integrator through a reset circuit, which causes the integrator to be reset and to commence a new integration cycle. In this fashion, the frequency of the firing pulses applied to the inverter circuit thyristors increases with the magnitude of the DC voltage, and thus the motor speed is dependent upon the magnitude of the DC voltage applied to the inverter.

At start-up of the machine, natural discontinuities in the current supplied by the semiconverter permits the desired rotational energization of the armature winding of the motor before the induced voltages in the motor windings are sufficiently great to provide the commutating voltages that would otherwise be required when a naturally commutated inverter is being utilized, as in the preferred embodiment disclosed herein. If the source of DC voltage does not have inherent discontinuities, a modulating source must be utilized to produce discontinuities in the current at start-up. Of course, a forced commutated inverter circuit could also be utilized, if desired.) However, these discontinuities result in erroneous operation of the integrator, and thus a wave shaping circuit is utilized to prevent discontinuities from adversely affecting the integrator. This waveshaping circuit may be a diode and resistive arrangement to feed back the signals from the motor windings to the DC side of the inverter circuit.

A regulating circuit, such as a ramp signal generator, is utilized to control the semiconverter to produce a gradually increasing DC voltage upon start-up of the arrangement, so that the motor will be gradually accelerated to the desired ultimate speed. In order to achieve the desired natural commutation, the inverter must supply a leading power factor current to the motor windings. However, the inverter could settle into a lagging power factor mode of operation. For some environments it might be necessary to preclude such a type of operation, but in connection with the centrifugal compressor drive discussed herein, it is sufficient to adopt a trial-and-error start/stop procedure of ensuring that the inverter always finally settles into the leading power factor mode.

To assure this type of operation, a current detecting arrangement is necessary to sense the current being supplied to the inverter. If the inverter settles into the lagging mode of operation, an excessive current will be drawn as soon as the discontinuous current present at start-up becomes continuous, since natural commutation will not be achieved. At this point the current will exceed an abnormal start current level reference signal which is applied to an abnormal start comparator circuit, along with a signal representative of the detected current supplied to the inverter. At this point, a signal is applied to the ramp signal generator to reset it to recommence production of the ramp signal.

Resetting of the ramp signal generator when the motor has been brought to operating speed, is precluded since the desired current may exceed the abnormal start current at this point. This is achieved by utilizing a ramp comparator circuit to compare the ramp signal with a window reference signal representative of the voltage level of the ramp signal above which it is desired to render the abnormal start resetting arrangement inoperative. The ramp comparator produces an output only when the ramp signal has a potential less than the window reference signal. A reset circuit, such as a NAND gate and associated signal producer, insures that the abnormal start comparator will reset the ramp signal generator only when the ramp signal has a magnitude less than the window reference signal.

With this arrangement, a centrifugal compressor drive may be realized which has the following features: (1) soft start (i.e., no surge currents); (2) smaller overall size of the compressor; (3) an arrangement operable from multiple frequency inputs (e.g., 60 Hz, 50 Hz, 25 Hz); (4) simplified lubrication due to elimination of the gears in one half of the bearings; and (5) electronic speed control as opposed to changing gears. Further, a commutatorless DC motor drive arrangement is provided which is simplified and reduced in size, with a corresponding reduction in cost. The motor shaft position sensor of prior art commutatorless DC motor arrangements is eliminated and replaced by a completely electronic control. In addition, a commutatorless DC motor drive arrangement is provided in which the motor speed is inherently compensated as the load is varied.

The foregoing and other objects, advantages and features of this invention will hereinafter appear, and for purposes of illustration, but not of limitation, an exemplary embodiment of the subject invention is shown in the appended drawing.

BRIEF DESCRIPTION OF THE DRAWING

FIG. 11 is a schematic block diagram of a speed regulating circuit to be utilized in conjunction with the present invention.

DESCRIPTION OF THE PREFERRED EMBODIMENT

Figure 1A:
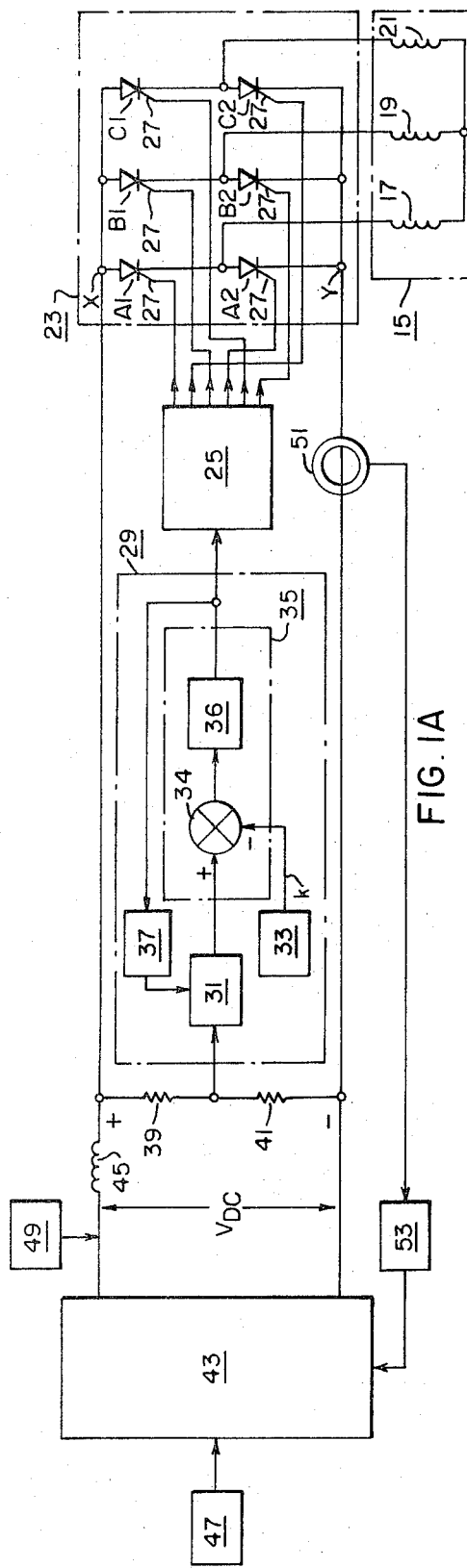
FIG. 1A is a schematic block diagram of a preferred embodiment of the present invention.

A preferred embodiment of the subject invention is illustrated in FIG. 1A. The use of this preferred embodiment in the particular application of a centrifugal air-conditioning compressor is illustrated in greater detail in FIGS. 3 and FIGS. 5–11.

With the arrangement of this invention, the need for a motor shaft position sensor is completely eliminated. In addition, the arrangement of FIG. 1 provides a dynamic performance that is superior to that obtained with prior art devices, as the arrangement of this invention inherently compensates for speed changes of the motor as the loading of the motor is varied. For purposes of this description, a fan-type load (specifically, a centrifugal air-conditioning compressor) which uses natural commutation over the whole speed range will be assumed. Of course, the invention also has applicability for other types of loading conditions, with either forced or natural commutation of the inverter.

In FIG. 1A a three-phase synchronous motor 15 is represented by armature windings 17, 19 and 21, which have corresponding phase designations a, b and c. Although the motor 15 as shown here is a three-phase motor, it should be recognized that either a single-phase or poly-phase motor having other than three phases may be equally well employed in some situations.

Armature windings 17, 19 and 21 of motor 15 are energized by an inverter 23. Inverter 23 has three pairs of selectively actuable switching devices, such as silicon controlled rectifiers or other thyristors, A1-A2, B1-B2 and C1-C2. Each of these pairs of thyristors is connected in series between the DC terminals designated X and Y. Each of the armature windings 17, 19 and 21 of motor 15 has one end connected to the mid-point of an associated pair of the thyristors. The other ends of windings 17, 19 and 21 are connected in common. These windings could also be connected in a conventional delta arrangement.

Firing or gating of thyristors A1-A2, B1-B2 and C1-C2 is achieved by means of firing pulse control circuit 25. Firing pulse control circuit 25 applies firing pulses to gates 27 of the thyristors to condition the thyristors for conduction. Since natural commutation is being employed in this particular embodiment, the thyristors will be commutated off by the induced voltages in windings 17, 19 and 21. The operation of systems such as inverter 23 and firing pulse control circuit 25 are explained in greater detail in the text "Thyristor Phase-Controlled Converters and Cycloconverters" by B. R. Pelly, published by Wiley-Interscience Division of John Wiley and Sons, Inc. in 1971.

The frequency or spacing of the firing pulses produced by firing pulse circuit 25 is determined by a control circuit 29. Control circuit 29 includes an integrator circuit 31, an integrator reference source 33 to provide an integrator reference level signal k, a level comparator 35 and a reset circuit 37. Level comparator 35 may be functionally represented by a summer 34 and a crossover detector 36. The voltage appearing across terminals X and Y of inverter 23 ($V_{XY}$) appears across the voltage divider network of resistors 39 and 41. The voltage appearing at the midpoint of resistors 39 and 41 is connected to integrator 31.

Figure 1B:
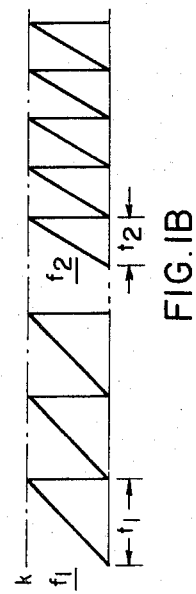
FIG. 1B is a schematic waveform diagram illustrating the effect of the constant time integral approach in the embodiment of FIG. 1A.

Integrator 31 then produces an output signal that depends upon the magnitude of $V_{XY}$, as illustrated by the two waves in FIG. 1B. The first wave in FIG. 1B is for a relatively lower DC voltage $V_{XY}$, while the second wave illustrates the output of integrator 31 for a relatively higher voltage $V_{XY}$. At a magnitude determined by the integrator reference signal k, level comparator 35 produces an output timing pulse which is applied to firing pulse circuit 25 to control the production of firing pulses. Each time that a timing pulse is produced, reset circuit 37 resets integrator 31 to recommence integrating the applied DC voltage.

As may be seen in FIG. 1B, the magnitude of the voltage $V_{XY}$ will determine the rate or frequency of the timing pulses, and hence the rate or frequency of the firing pulses produced by circuit 25. For a relatively low voltage, it takes a relatively long time $t_1$ for the output of integrator 31 to reach the reference level k. Therefore, the repetition rate or frequency $f_1$ is relatively low. As the voltage increases, as illustrated by the second waveform, the time $t_2$ for the integrator output to reach level k is decreased, and the frequency $f_2$ is higher.

In view of the immediately preceding discussion, it may be seen that the output voltage of a controllable DC voltage source 43 applied to inverter 23 through a smoothing inductor 45 may be utilized to determine the speed of motor 15. Such speed control may be achieved by a regulating circuit 47, which determines the output voltage $V_{DC}$ of source 43. Regulating circuit 47 causes the voltage $V_{DC}$ produced by source 43 to be applied to the inverter circuit 23 with a gradual buildup to full magnitude. In this fashion, motor 15 is gradually brought up to full speed at an acceleration rate that may be determined by proper setting of the regulating circuit 47.

The operation of the circuit of FIG. 1A under steady state conditions may now be described. The basic function of control circuit 29 is to produce timing pulses that will determine the timing of the inverter firing pulses in such a manner that a constant volt-time interval of the voltage $V_{xy}$ across the inverter is maintained between successive inverter firing pulses (the achievement of which is illustrated by FIG. 1B). This condition may be expressed by the following formula:

$$\int_t^T V_{XY} \, dt = T V_{AV} = \frac{V_{AV}}{6f} = k$$

where $V_{AV}$ = average value of the inverter DC terminal voltage (i.e., average value of $V_{XY}$)

$T = 1/6f$ = time interval between thyristor firing instances
$f$ = frequency applied to motor
$k$ = a constant, representing the fixed volt-time integral maintained.

Now, from conventional converter theory, the following relationship applies between the average voltage at the DC terminals and the induced motor voltage (assuming no commutation overlap):

$$V_{AV} = 3\sqrt{3}/\pi \, V_m \cos \delta$$

where
$V_m$ = peak value of line-neutral motor voltage (assuming sinusoidal wave shape)
$\delta$ = inverter recovery angle (angle of fundamental component of inverter output current with respect to the machine voltage)

Combining the equations given above results in the expression:

$$Kf = \sqrt{3}/2\pi \, V_m \cos \delta$$

With a constant excitation of the motor:

$$V_m = cf$$

Note that at no-load, $c$ has a constant value. However, $c$ does have a varying value with load due to the effect of armature reaction (typically it might change by 20 percent from no-load to full load).

From the relationships given above:

$$\cos \delta = k/c \, 2\pi/\sqrt{3}$$

From this equation, it may be seen that with this type of operation the inverter recovery angle $\delta$ and the power factor of the machine ($\cos \delta$) remain constant, regardless of speed (this assumes that $c$ remains constant, i.e., that the torque remains constant). It is to be noted, however, that this relationship theoretically permits either a lagging or leading inverter angle. This indicates that the system operation could theoretically settle into one of two modes, with the inverter operating either at leading or lagging phase angle. For the scheme using natural commutation of the inverter, however, only a leading mode (i.e., the provision of leading current to the motor) is permissible in practice. Therefore, it is necessary to ensure that at start-up the system operation settles into the desired leading mode.

In practice, due to the effect of the subtransient reactance of the motor, the natural commutations of the inverter do not take place instantaneously. Instead, at each commutation there is an overlap angle, $u$, during which both the incoming and outgoing thyristors are simultaneously in conduction. Thus, the expression for $V_{AV}$ given above is modified to be:

$$V_{AV} = 3\sqrt{3}/\pi \, V_m \, \tfrac{1}{2} [\cos \delta = \cos (u + \delta)]$$

With this modification, the expression for the power factor given in the second preceding equation becomes:

$$\cos \delta + \cos (u + \delta) = k/c \, 4\pi/\sqrt{3}$$

From the foregoing theoretical analysis, with specific reference to the first equation given above, it may be seen that the motor frequency, and hence also the speed of the motor, is directly proportional to the average voltage appearing across the DC terminals XY of the inverter 23. It follows, then, that the motor speed is directly proportional to the applied DC voltage, $V_{DC}$ regardless of load (assuming that the relatively small average voltage drop across the smoothing inductor 45 may be neglected). In other words, the synchronous motor/inverter combination, as viewed by the DC supply 43, behaves in the same way as a perfectly level-compensated DC motor.

Figure 2:
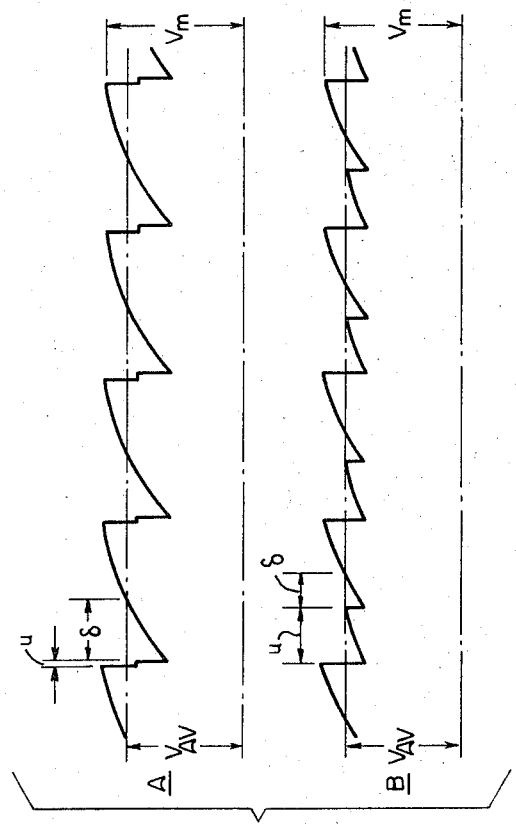
FIG. 2 schematically illustrates the DC voltage appearing at the inverter of FIG. 1A for different loading conditions.

The last equation given above also indicates the manner in which the control scheme of this invention varies the inverter firing angle with changing load. As the load increases, the overlap angle $u$ increases, and the inverter recovery angle $\delta$ decreases. On the theoretical assumption that the motor terminal voltage remains constant, the inverter firing angle $(u + \delta)$ would increase with increasing load. This is illustrated in the waveforms of FIG. 2, in which waveform A illustrates the conditions for a relatively light load, while waveform B illustrates conditions for full load. In practice, the amplitude of the induced motor voltage decreases with increasing load, due to armature reaction, and the control compensates against this by tending to decrease the firing angle. The net effect on the firing angle of the simultaneous increase of overlap angle and decrease of motor voltage depends upon the characteristics of the particular motor. Typically, the firing angle tends to decrease slightly with increasing load.

The foregoing description of the operation of this invention has related to normal steady state running conditions. As previously indicated, there are problems associated with bringing the motor up to speed without a motor shaft position sensor. In the prior art devices which sense the induced motor voltages for speed control, the low amplitude or "noisy" voltages that are induced upon initial start-up are such that the instantaneous level thereof cannot be depended upon for controlling the production of firing pulses. In the present invention, this "noisy" voltage is not a problem, as the inverter voltage $V_{xy}$ is integrated before the level comparison takes place. In addition, level comparator 29 invariably detects the same fixed level of voltage $k$, regardless of speed, as illustrated by FIG. 1B. Control circuit 29 may be characterized as a voltage controlled oscillator with a linear voltage to frequency transfer characteristic, which responds to the average rather than the instantaneous level of input. Therefore, once the DC voltage is applied to the inverter, however small this DC voltage may be, the "oscillator" or control circuit 29 causes the production of inverter firing pulses in an inherently reliable fashion.

In order to naturally commutate the inverter at start-up a modulating source 49 is utilized to superimpose a relatively high frequency (with respect to the inverter starting frequency) ripple component onto the applied DC voltage $V_{DC}$. With this arrangement, at low average values of input voltage the waveform of the current fed to the inverter 23 is discontinuous and consists of a train of discrete pulses at relatively high frequency. As the average DC input voltage to inverter 23 is increased from zero, firing pulses start to be rotated in sequence around the inverter thyristors, and hence the discontinuous input current is fed in sequence to the motor windings. Because of the discontinuous input current waveform, the inverter 23 is relieved of the duty of commutating the current, and, in essence, inverter 23 functions as a distributor for the discontinuous input current pulses during start-up. Thus, even if the motor may initially be in the wrong position, this does not matter so far as inverter commutation is concerned, since, within a few "switching intervals" of the inverter, the motor rotor is automatically pulled into the stable position. However, this arrangement may operate at a stable mode with the inverter providing either a lagging power factor or a leading power factor. So long as the input current consists of a train of discontinuous pulses, the system can operate in either mode, since the current is effectively commutated from the DC input side rather than by the induced voltages. However, as the input voltage is raised, and the input current starts to become continuous, the output current must now be commutated by the induced motor voltages. This can be achieved only so long as the inverter has settled into a leading mode of operation. If the inverter has settled into the leading mode of operation, further increase of the DC input voltage $V_{DC}$ results in the smooth acceleration of the motor up to the final desired speed setting.

On the other hand, if the inverter has settled into a stable mode of operation where it provides a lagging power factor, then the inverter is incapable of commutating the current when it becomes continuous. If the inverter is incapable of commutating the current, a relatively large current is drawn from the DC supply 43 through the faulted inverter, and the motor 15 drops out of synchronism. In many applications of this arrangement, such as the particular one disclosed herein, it is quite acceptable to simply reset the DC input voltage to zero in the event of an unsuccessful start attempt and to continue starting up in this fashion on a trial-and-error method until the proper stable mode of operation is achieved. This may be achieved by utilizing a current detecting or sensing device 51 to determine the current supplied to the inverter by the DC voltage source 43. A restart circuit 53 may be utilized to determine when the current detected by current detecting device 51 exceeds a desired level, indicating commutation failure, and to cause the voltage source 43 to be returned to zero and to again start applying a gradually increasing voltage $V_{DC}$. Statistically, a 50 percent chance exists for starting the motor in the desired leading mode. Thus, the motor invariably starts successfully after no more than a few attempts. In practice, of course, this trial-and-error method can be fully automated, so that to all external appearances any aborted start attempts pass virtually unnoticed, taking a few tenths of a second until the motor eventually starts in the right direction.

Figure 3:
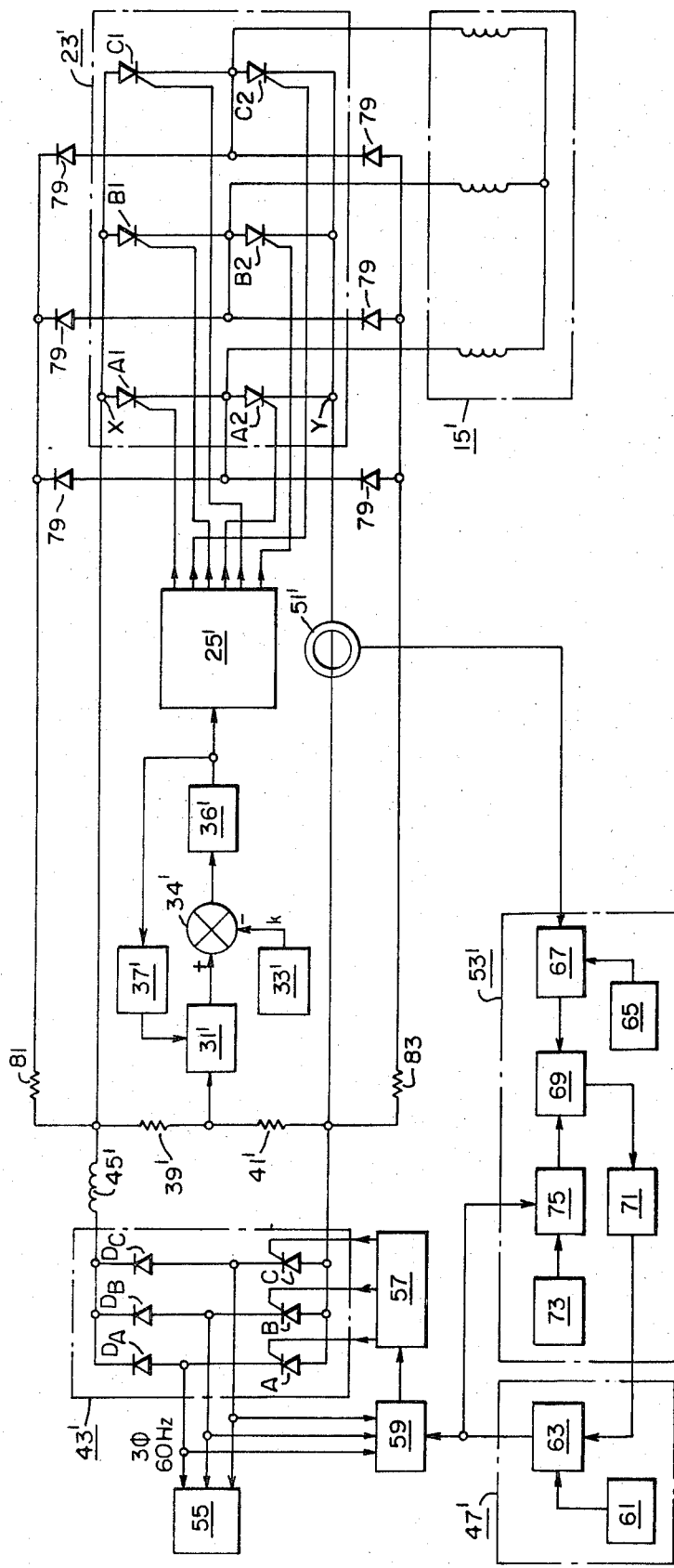
FIG. 3 is a schematic circuit diagram illustrating use of the FIG. 1A embodiment in a specific application.

As this drive arrangement was developed for a high-speed direct drive centrifugal compressor, use of the arrangement of FIG. 1 for this particular application is illustrated in FIG. 3. For ease of reference, identical elements in the FIG. 3 structure have been identified by primed numerals corresponding to the numerals of FIG. 1.

It may be noted that the controllable DC voltage source 43 in this particular application becomes a semiconverter 43' supplied from a three-phase 60 Hz AC supply 55. Semiconverter 43' has three thyristors, such as silicon control rectifiers A, B and C, each of which is connected in series with a corresponding diode $D_A$, $D_B$ or $D_C$. A semiconverter firing pulse circuit 57 distributes firing pulses to gate thyristors A, B and C in the appropriate sequence. Phase control of the firing pulses of firing pulse circuit 57 may be utilized to determine the magnitude of the DC voltage produced at the output of semiconverter 43'. This type of control or regulation is determined by a semiconverter phase angle control circuit 59. Regulating circuit 47' regulates the control exercised by the semiconverter phase angle control 59.

As previously indicated, regulating circuit 47' should apply a gradually increasing signal upon start-up of the system so that the motor 15' may be brought up to full speed in a predetermined gradual manner. Thus, regulating circuit 47' has a start signal generator 61 which produces a start signal upon initial energization of the system. The start signal is fed to a ramp signal generator 63 which produces a gradually increasing ramp signal having a predetermined slope. This ramp signal is applied to the semiconverter phase angle control circuit 59 to cause the DC voltage produced by semiconverter 43' to have the gradually increasing characteristic of the ramp signal.

Restart circuit 53' is illustrated in some detail. An abnormal start reference source 65 provides an abnormal start current level reference signal indicative of an excesss current representing an abnormal start. An abnormal start comparator circuit 67 compares the abnormal start current level reference signal and the signal produced by current detector 51'. If the current sensed by detector 51' is in excess of the current level represented by the abnormal start current level reference signal, the abnormal start current comparator 67 produces an output which results in resetting of ramp signal generator 63 to recommence buildup of the ramp signal. The reset arrangement includes a NAND gate 69 and reset circuit 71.

As the normal load current drawn by inverter 23' may well exceed the abnormal start current level reference, it is desirable to disable restart circuit 53' after the DC voltage produced by semiconverter 43' has exceeded a certain magnitude. The level at which restart circuit 53' is to be disabled is established by a window reference source 73, which produces a window reference signal indicative of the point at which it is desired to cut off the restart circuit 53'. The window reference signal is applied to a ramp comparator circuit 75, together with the ramp signal from ramp signal generator 63. Ramp comparator 75 produces an output until the ramp signal exceeds the window reference level signal. At this point, the logic "1" is removed from NAND gate 69 and the production of a "1" by abnormal start comparator 67 will not restart ramp signal generator 63. By use of semiconverter 43', it is not necessary to modulate the DC voltage applied to the inverter to produce a discontinuous current at start-up, since the semiconverter 43' inherently produces a ripple voltage component with a fundamental frequency of 180 Hz that is superimposed on the DC output of the semiconverter. Therefore, with appropriate design of the smoothing inductor 45', the current fed to inverter 23' at low values of the DC voltage is naturally discontinuous.

Figure 4:
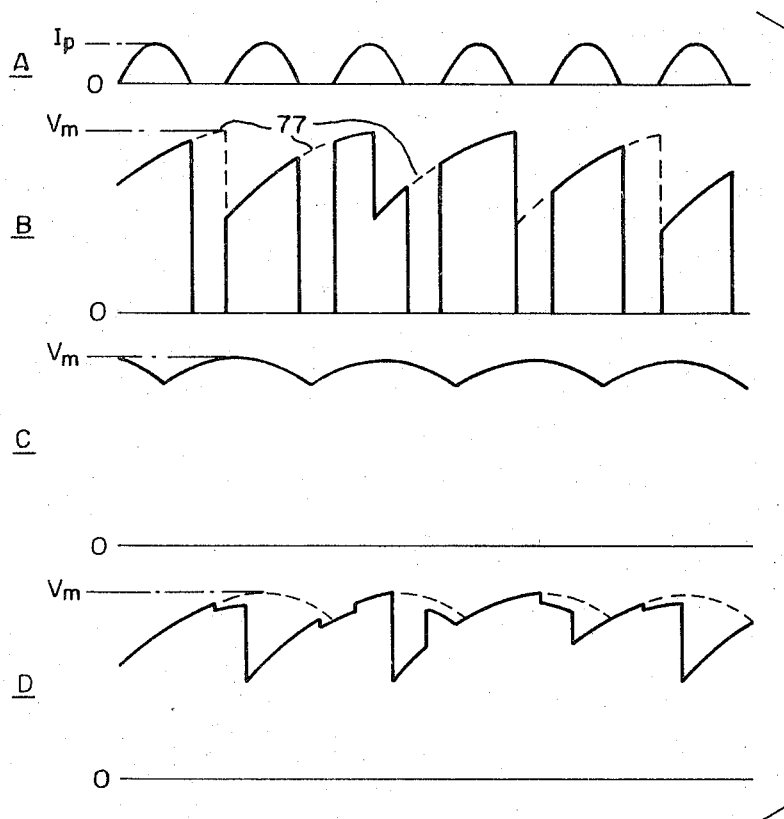
FIG. 4 is a series of schematic waveform diagrams illustrating the effect of wave-shaping circuitry included in FIG. 3.
Figure 6:
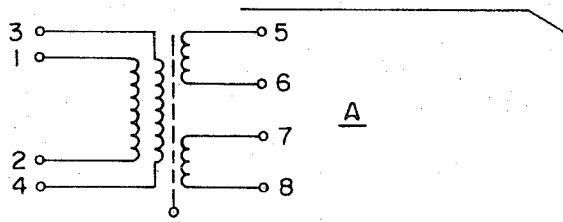
FIG. 6 is a schematic diagram illustrating the timing transformer of the FIG. 5 circuit.
Figure 6:
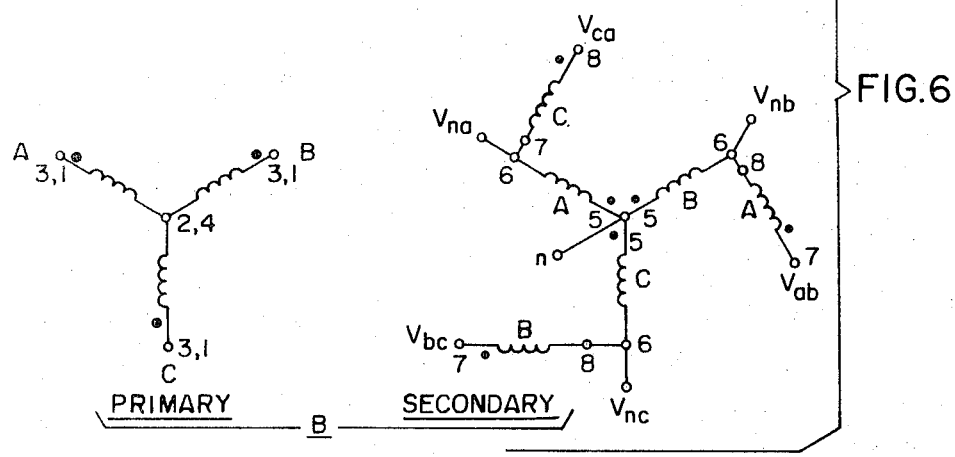

During start-up, the discontinuous current would appear as illustrated in idealized form by waveform A of FIG. 4. The corresponding idealized DC terminal voltage $V_{XY}$ is illustrated in waveform B of FIG. 4. It will be noted that there are certain voids 77 that occur as a result of the discontinuities in the DC voltage, corresponding to the discontinuities in the current. These voltage voids 77 upset the operation of the integrator 31', since the back emf of motor 15' is blocked by the non-conducting thyristors during the void time. Thus, the voids subtract from the actual volt-time product which is integrated, causing a firing pulse to appear later than it should. This results in a change of power factor in the lagging direction (smaller power factor angle). The smaller power factor angle may cause a commutation failure, since commutation time is reduced. To overcome this problem, a wave-shaping circuit including diodes 79 and resistors 81 and 83 is utilized. Each of the resistors 81 and 83 have an end thereof connected to a respective DC terminal X or Y. Diodes 79 are arranged in three pairs, each pair being connected in series between the other ends of the resistors 81 and 83. The midpoint of each path of diodes is connected to the midpoint of a corresponding pair of thyristors A1-A2, B1-B2, or C1-C2. Waveform C of FIG. 4 illustrates the full wave rectified output voltage that appears at the outputs of diodes 79. The manner in which this voltage assists in filling in the voids 77 is illustrated by waveform D of FIG. 4.

Figure 5:
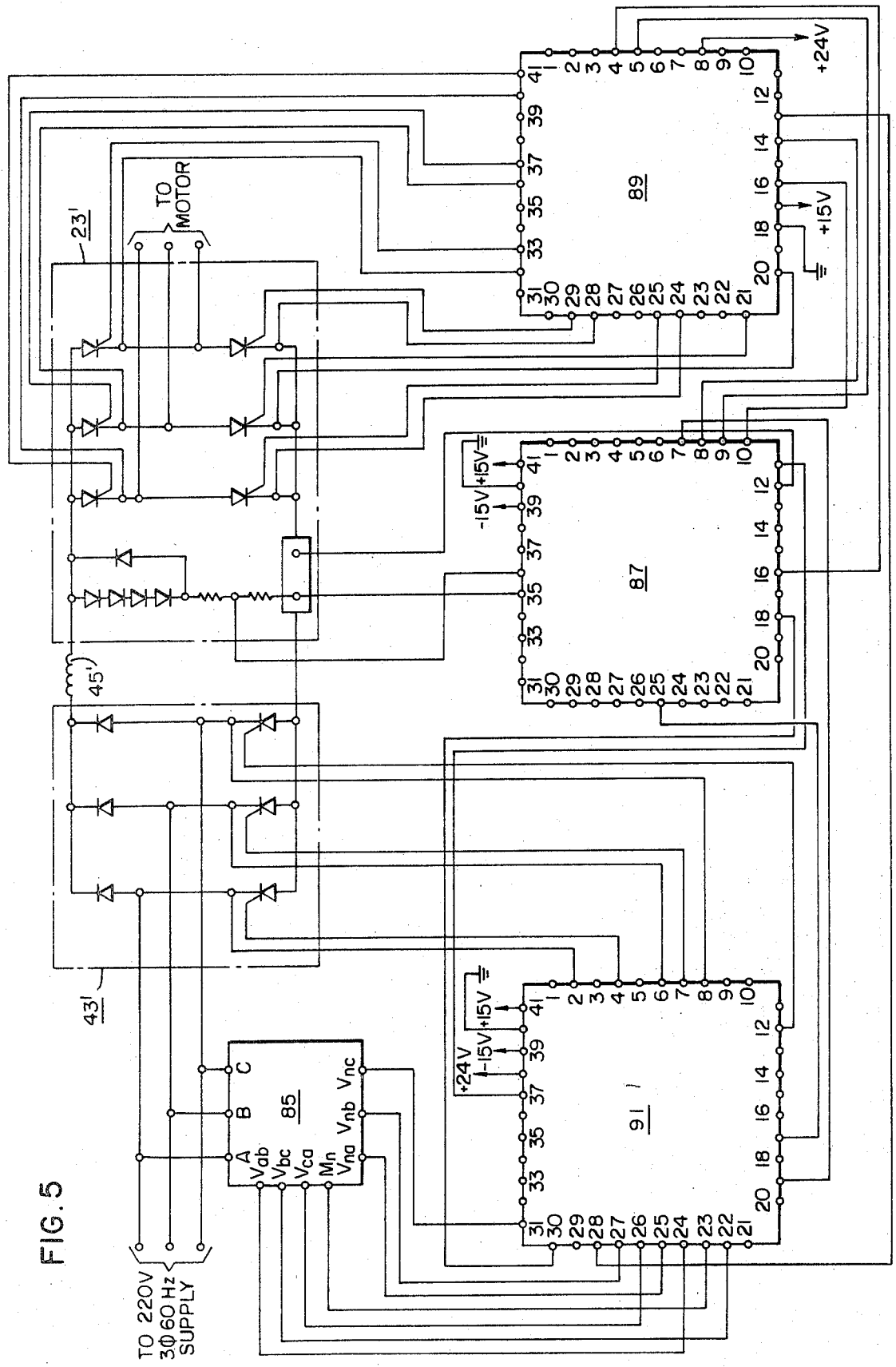
FIG. 5 is a block diagram of a more detailed arrangement of the embodiment of FIG. 3.
Figure 7:
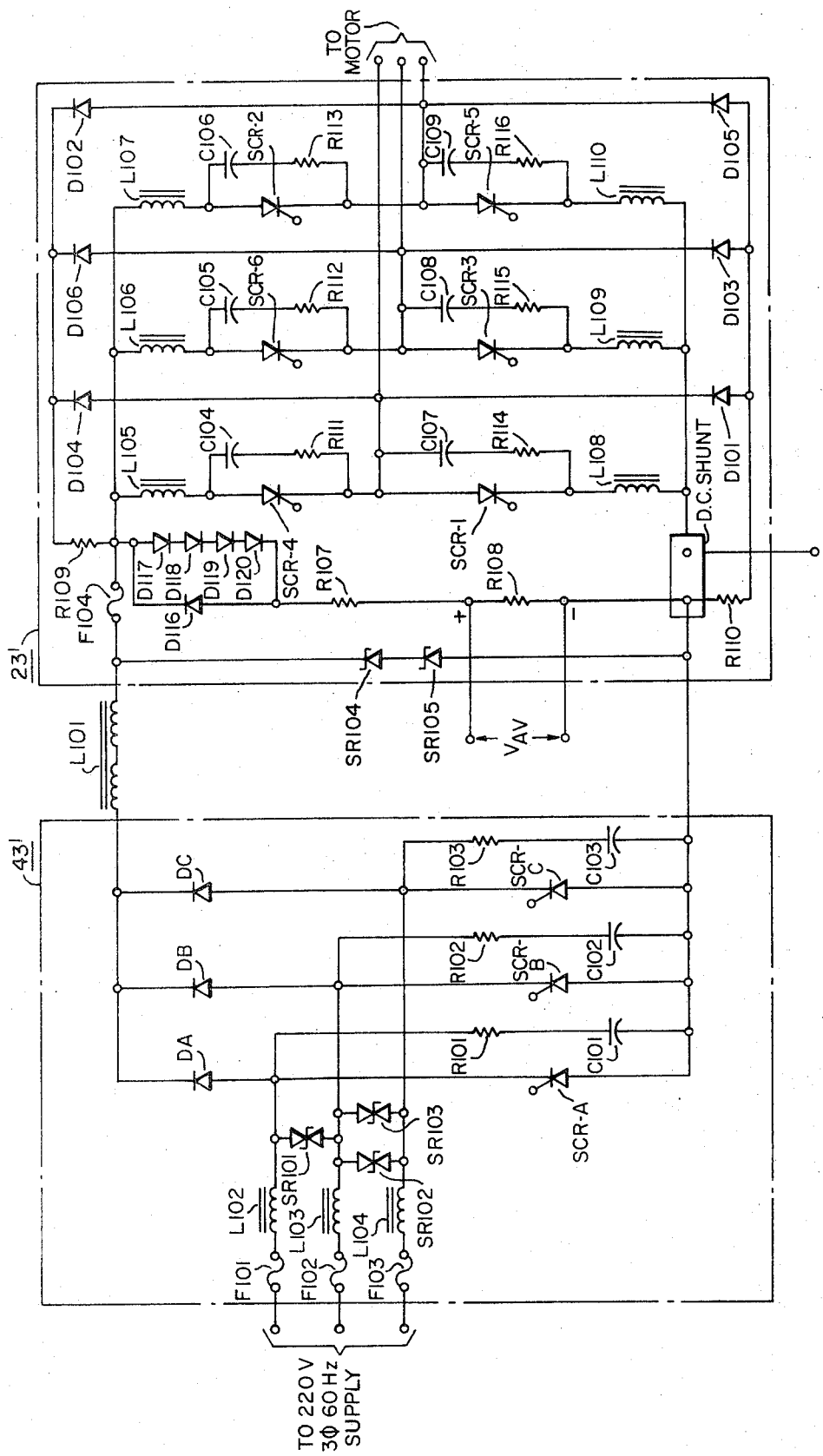
FIG. 7 is a schematic circuit diagram illustrating the semiconverter and converter circuitry utilized in the FIG. 5 arrangement.
Figure 8:
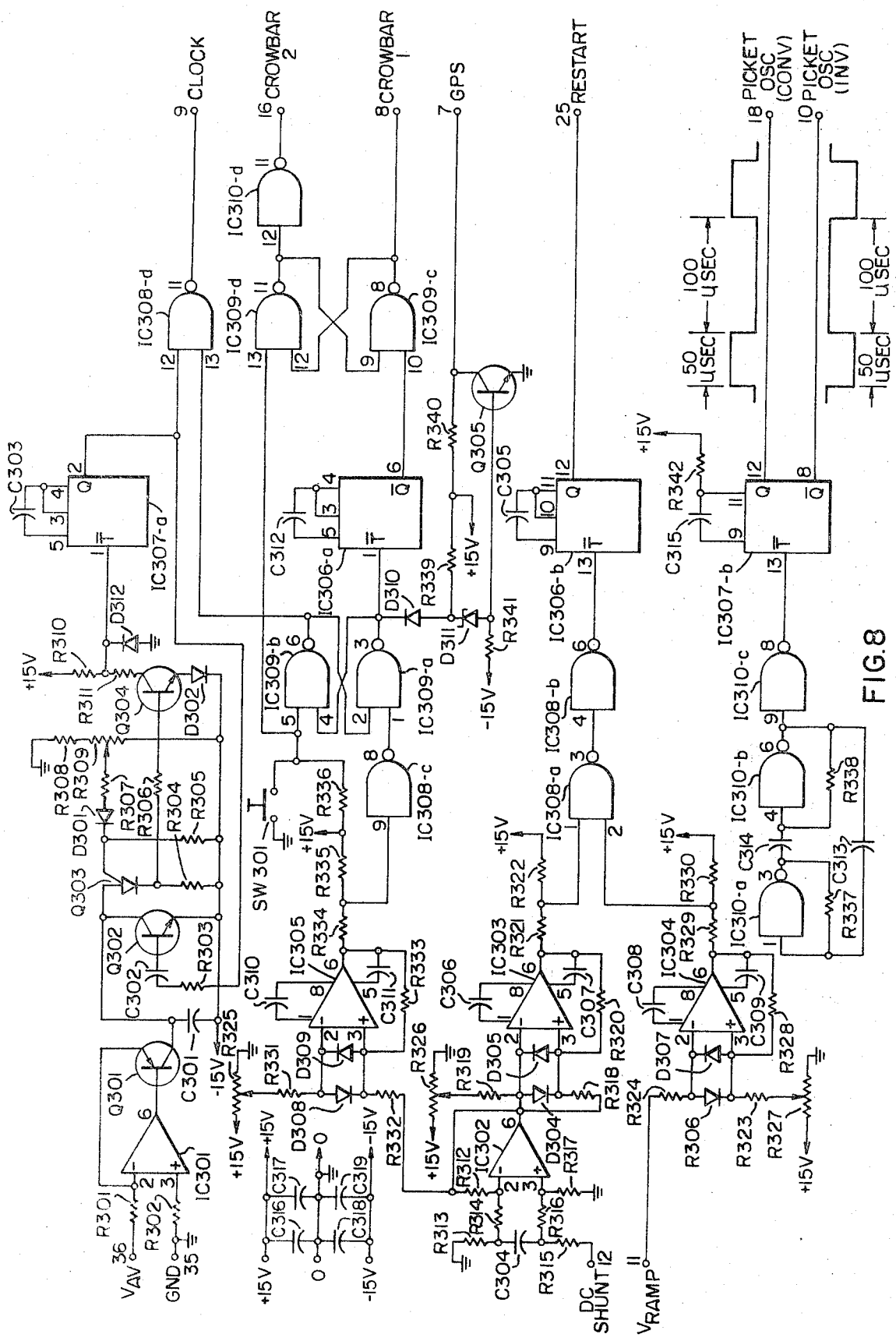
FIG. 8 is a schematic circuit diagram of a first portion of the control circuitry of the FIG. 5 arrangement.
Figure 9:
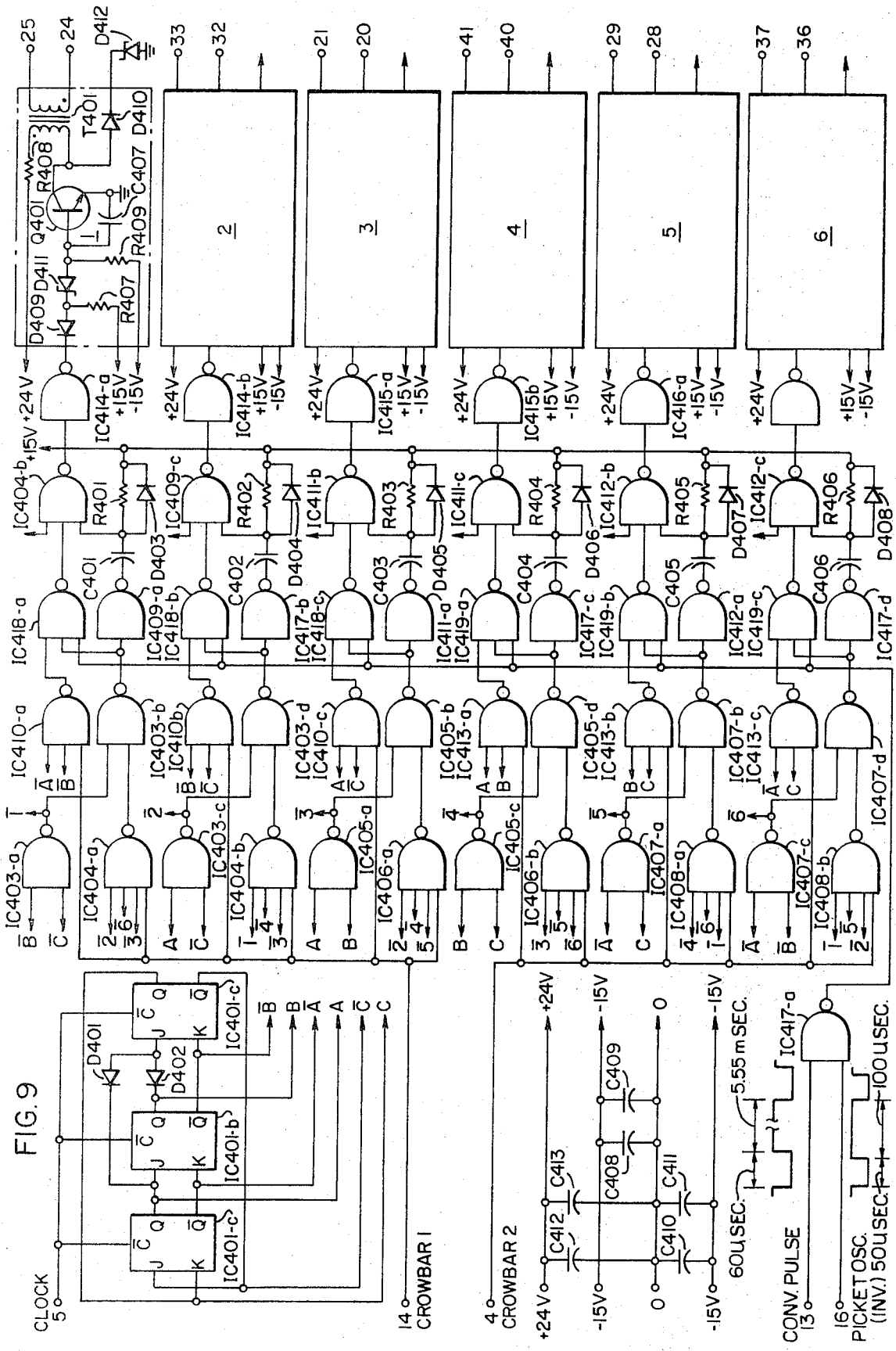
FIG. 9 is a schematic circuit diagram of a second portion of the control circuitry of the FIG. 5 arrangement.

In practice, the thyristors require relatively high current to be kept in conduction, which means that resistors 81 and 83 would have to be relatively small in order to achieve this. Actually, however, it would defeat the purpose of the starting method to keep the thyristors conducting continuously, and all that is necessary is to impress the rectified motor voltage on resistors 39 and 41. This means that the sum of resistors 81 and 83 could be in the order of one-tenth of the sum of resistors 39' and 41', which is a quite practical value. The voids are not filled in exactly (as may be seen in waveform D in FIG. 4), but the firing pulses produced by firing pulse circuit 25' are not out of the position, as is the case when the wave-shaping circuit is not utilized. Therefore, the integrator 31' integrates a voltage which is essentially continuous, while a discontinuous current is still applied to motor 15'. A complete circuit diagram for use of the present invention in the application of FIG. 3 is illustrated in FIGS. 5-11. FIG. 5 depicts in semi-block diagram form the segments of the circuitry shown in greater detail in the subsequent figures. A timing transformer 85 (shown in detail in FIG. 6) provides the phase angle control information of block 59 in FIG. 3. Semiconverter 43' and inverter 23' are shown in detail in FIG. 7.

A motor controller oscillator, start and overcurrent segment 87 (illustrated in detail in FIG. 8) provides the timing control pulses of control circuit 29 in FIG. 1A to cause proper production of the firing pulses by firing pulse circuit 25. This segment also contains the start logic to restart the system if the motor begins running in the undesired lagging power factor mode. An overcurrent sense logic is included on the board to provide logic to introduce a "crowbar" effect in the inverter that shunts the DC link current around the motor 15 and provides a signal to the semiconverter control to "phase back" the semiconverter 43, if an unsafe condition appears in the system. This latter circuit is required since a permanent magnet rotor is to be used with this specific embodiment, and excessive currents in the motor must be avoided, since these currents would demagnetize the rotor.

A motor controller inverter drive segment 89 controls the production of firing pulses to the inverter thyristors. Since current is discontinuous during start-up, a continuous gate drive is required for the inverter thyristors. The motor controller inverter drive segment 89 provides and distributes to the inverter thyristors a "picket fence" output. Although this type of output is not actually continuous, the frequency of the pulses is such that during start-up, compared to the motor frequency and the semiconverter switching frequency, the gate drive appears for all practical purposes to be continuous. Segment 89 is shown in detail in FIG. 9.

Figure 10:
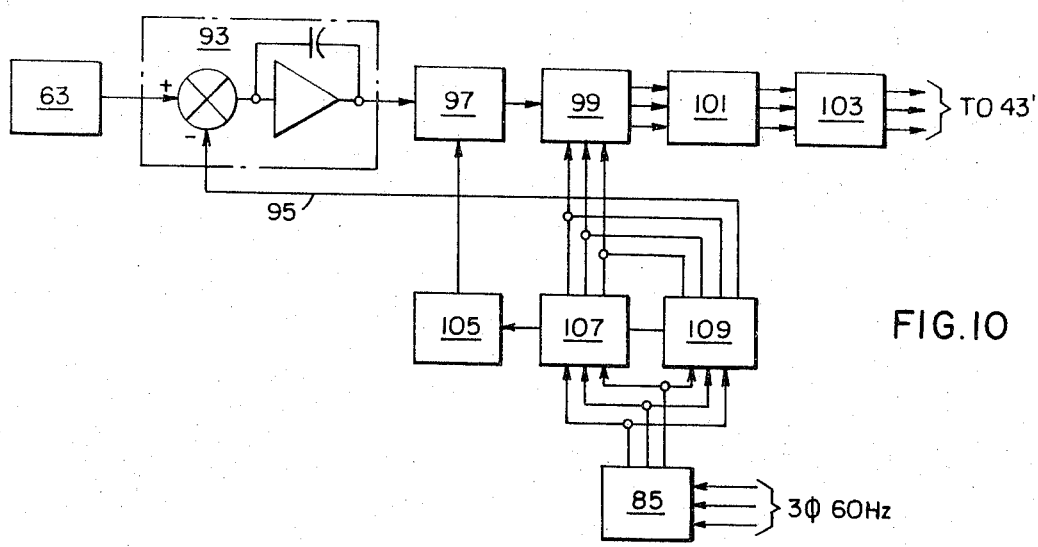
FIG. 10 is a schematic block diagram of the control circuitry for the semiconverter of the FIG. 5 arrangement.

A semiconverter control segment 91 provides the logic controlling output voltage of the semiconverter 43'. This circuitry consists of a a phase-locked oscillator firing pulse generator. The circuit also provides a picket fence pulse drive, the pickets of which are synchronized with the inverter drive pickets. This synchronization is necessary because the current is discontinuous at starting, and it must be ensured that whenever a semiconverter thyristor is pulsed, the appropriate pair of inverter thyristors are simultaneously pulsed. As previously described, a starting ramp is included in the circuit to provide smooth progression of voltage VDC from zero to full on as required for gradual acceleration of the motor. In FIG. 10, there is displayed a block diagram of the semiconverter control segment 91. It may be seen that the ramp signal generator 63 passes the ramp signal to a differential amplifier and integrator 93, that produces an output error signal based upon the difference between the ramp signal and a feedback voltage appearing on line 95. The error signal is applied to a voltage controlled oscillator 97 to produce the requisite operating frequency. The pulse train from voltage controlled oscillator 97 is conveyed to a distribution logic arrangement 99 which counts down the pulses and multiplexes the proper wave-shape for conveyance to a picket fence logic 101. The picket fence output of logic 101 is passed to pulse amplifiers 103 and then conveyed to the gate circuits of the semiconductors in semiconverter 43'. An end stop detector 105 ensures that the pulses produced by voltage controlled oscillator 97 are synchronized with the line. The output of end stop detector 105 is determined by an end stop generator 107, which is connected to a pseudo-semiconverter feedback 109. This latter circuit is used to perform feedback control and synthesizes various converter waveforms at control circuit levels. End stop generator 107 and pseudo-semiconverter feedback 109 are fed by the timing transformer 85 to provide the proper phase angle information. A more detailed illustration of the semiconverter control segment 91 is contained in FIG. 11.

A complete description of FIGS. 6-9 and 11 is not undertaken at this point, as such an endeavor would make the description unduly prolonged. The foregoing description of the basic circuitry fully describes the invention and, with these additional drawings, will enable a person skilled in the art to readily construct an operative circuit. However, to further amplify the disclosure suitable values of the circuit components in FIGS. 6-9 and 11, for a respresentative 130 horsepower system, may be as follows:

TIMING TRANSFORMER — FIG. 6

Windings 1-2 and 3-4, each 2,500 turns No. 36
Windings 5-6 and 7-8, each 70 turns No. 33
Core — TH-56 "E"

SEMICONVERTER AND INVERTER — FIG. 7

F101, F102, F103, F104 — 250 amp. Fuses
L102, L103, L104 — 15 Microhenry Inductors SR101, SR102, SR103 — 3CA450A Voltrap
DA, DB, DC — 783ZD Diodes
SCR-A, SCR-B, SCR-C — 273ZD Thyristors
R101, R102, R103, — 25 ohm, 2 Watt Resistors
C101, C102, C103, C104, C105, C106, C107, C108, C109 — 0.15 Microfarad, 1,000 Volt Capacitors
L101 — 3 Millihenry Inductor
SR104, SR105 — 1AA30AC Voltraps
DC SHUNT — PS851 (200 amp., 100 Millivolt)
D116 — 1N645
D117, D118, D119, D120 — IN4148
R107 — 30 Kohm, 20 Watt, 1 percent Resistor
R108 — 1 Kohm, ½ Watt, 1 percent Resistor
R109, R110 — 1 Kohm, 5 Watt Resistors
D101, D102, D103, D104, D105, D106 — IN5399 Diodes
SCR-1, SCR-2, SCR-3, SCR-4, SCR-5, SCR-6 — 2732Z Thyristors
R111, R112, R113, R114, R115, R116 — 25 ohm, 30 Watt, Non-inductive
L105, L106, L107, L108, L109, L110 — Ferrox Cube Ring Core 528T500-3C5

MOTOR CONTROLLER START AND OVERCURRENT — FIG. 8

IC301, IC302 — $\mu$A 741 Integrated Circuits
IC303, IC304, IC305 — $\mu$A 709 Integrated Circuits
IC306, IC307 — MC667 Integrated Circuits
IC308, IC309, IC310 — MC 672 Integrated Circuits
Q301 — 2N3799 Transistor
Q302, Q304, Q305 — 2N2222A Transistors
Q303 — D13T1 Unijunction Transistor
D301, D302, D303, D304, D305, D306, D307, D308, D309, D310, D312 — IN4148 Diodes
D311 — IN748 Diode
R301, R302, R303, R311, R336, R339, R340 — 1 Kohm, ¼ Watt, 5 percent Resistors
R304 — 5.1 ohm, ¼ Watt, 5 percent Resistor
R305 — 1 Mohn, ¼ Watt, 5 percent Resistor
R306 — 680 ohm, ¼ Watt, 5 percent Resistor
R307, R342 — 10 Kohm, ¼ Watt, 5 percent Resistors
R308, R317 — 5 Kohm, ¼ Watt, 5 percent Resistors
R309 — 10 Kohm, ¼ Watt, 5 percent Adjustable Tap Resistor
R310 — 12 Kohm, ¼ Watt, 5 percent Resistor
R312 — 5.11 Kohm, ¼ Watt, 5 percent Resistor
R313, R314, R315, R316 — 51.1 ohm, ¼ Watt, 5 percent Resistors
R318, R319, R323, R324, R331, R332 — 20 Kohm, ¼ Watt, 5 percent Resistors
R320, R328, R333 — 5.1 Mohm, ¼ Watt, 5 percent Resistors s
R321, R329, R334 — 1.8 Kohm, ¼ Watt, 5 percent Resistors
R322, R330, R335 — 2 Kohm, ¼ Watt, 5 percent Resistors
R325, R326, R327 — 1 Kohm, ¼ Watt, 5 percent Adjustable Tap Resistors
R337, R338 — 4.75 Kohn, ¼ Watt, 5 percent Resistors
R341 — 0.5 Kohm, 174 Watt, 5 percent Resistor
C301 — 0.68 $\mu$Farad, 10 percent, Polycarbonate Capacitor
C302, C304 — 0.01 $\mu$Farad, 50 Volt, 20 percent Capacitors
C303 — 750 PFarad, 50 Volt, 20 percent Capacitor
C305 — 2 $\mu$Farad, 50 Volt, 20 percent Capacitor
C306, C308, C310 — 10 PFarad, 50 Volt, 20 percent Capacitors
C307, C309, C311 — 3 PFarad, 50 Volt, 20 percent Capacitors
C312 — 700 PFarad, 50 Volt, 20 percent Capacitor
C313, C314 — 0.015 $\mu$Farad, 50 Volt, 20 percent Capacitors
C315 — 0.0068 $\mu$Farad, 50 Volt, 20 percent Capacitor

MOTOR CONTROLLER-INVERTER DRIVE — FIG. 9

IC401, IC402 — MC663 Integrated Circuits
IC403, IC405, IC407, IC417 — MC668 Integrated Circuits
IC404, IC406, IC408 — MC671 Integrated Circuits
IC409, IC410, IC411, IC412, IC413, IC418, IC419 — MC670 Integrated Circuits
D401, D402, D403, D404, D405, D406, D407, D408, D409 — 1N4148 Diodes
D410 — 1N645 Diode
D411 — 1N748 Zener Diode
D412 — 1N3041 Zener Diode
Q401 — 2N2405 Transistor
R401, R402, R403, R404, R405, R406, R409 — 15 Kohm, ¼ Watt, 5 percent Resistors
R407 — 470 ohm, ½ Watt, 5 percent Resistor
R408 — 100 ohm, 8 Watt, 5 percent Resistor
C401, C402, C403, C404, C405, C406 — 0.015 $\mu$Farad, 50 Volt, 20 percent Capacitors
C407 — 0.0027 $\mu$Farad, 50 Volt, 20 percent Capacitor
C408, C410, C412 — 1 $\mu$Farad, 50 Volt, 20 percent Capacitors
C409, C411, C412 — 0.1 $\mu$Farad, 50 Volt, 20 percent Capacitors

SEMICONVERTER CONTROL — FIG. 11

IC201 — A741 Integrated Circuit
IC202, IC204 — MC672 Integrated CIrcuits
IC203 — MC663 Integrated Circuits
IC205, IC206 — MC662 Integrated Circuits
IC207, IC208, IC209 — MC668 Integrated Circuits
Q201, Q203, Q205 — 2N2907 Transistors
Q202, Q206, Q208, Q209, Q210 — 2N2222A Transistors
Q204 — D13T1 Unijunction Transistor
Q207 — 2N5262 Transistor
Q211, Q212, Q214 — 2N2405 Transistors
D201 through D242 (except for D204, D211, D217, D218, D219, and D239) — 1N4148 Diodes
D204 — 1N959, 8.2 Volt Zener Diode
D211, D243, D244, D245 — 1N748, 3.9 Volt Zener Diodes
D217, D218, D219 — RD6235 Diodes
D239 — 1N3826A, 5.1 Volt, 1 Watt, 5 percent Zener Diode
D246, D247, D248 — 1N645 Diodes
D249 — 1N3041, 75 volt, 1 Watt Zener Diode
R201 — 2 Kohm, ¼ Watt, 5 percent Resistor
R202 — 5.1 Kohm, ¼ Watt, 5 percent Resistor
R203, R213 — 24 Kohm, ¼ Watt, 5 percent Resistors
R204, R214, R217, R222 — $k$ Kohm, ¼ Watt, 5 percent Resistors R205 — 6.2 Kohm, ¼ Watt, 5 percent Resistor
R206, R207, R212, R232 — 10 Kohm, ¼ watt, 5 percent Resistors
R208 — 430 Kohm, ¼ Watt, 5 percent Resistor
R209 — 1 Megohm, ¼ Watt, 5 percent Resistor
R210 — 200 phm, ¼ Watt, 5 percent Resistor
R211 — 2 Megohm, ¼ Watt, 1 percent Resistor
R215 — 300 ohm, ¼ Watt, 5 percent Resistor
R216 — 680 ohm, ¼ Watt, 5 percent Resistor
R218, R219 — 20 Kohm, ¼ Watt, 1 percent Resistors R220, R221, — 75 Kohm, ¼ Watt, 1 percent Resistors R223 — 5 ohm, ¼ Watt, 5 percent Resistor
R224, R225, R223, R241 — 20 Kohm, ¼ Watt, 5 percent Resistors
R226 — 4.3 Kohm, ¼ Watt, 5 percent Resistor
R227, — 10 Kohm, 10 Turn Trim Potentiometer
R228, R234 — 5 Kohm, ¼ Watt, 5 percent Resistors R229, R230 — 100 Kohm, ¼ Watt, 5 percent Resistors
R231 — 50 Kohm, 10 Turn Trim Potentiometer
R235, R236, R237, R238, R239, R240, R246, R247, R248, R252, R253, R254 — 15 Kohm, ¼ Watt, 5 percent Resistors
R242 — 200 ohm, 1 Watt, 5 percent Resistor
R243, R244, R245 — 470 ohm, ½ Watt, 5 percent Resistors
R249, R250, R251 — 100 ohm, 8 Watt, 5 percent Resistors
R255 — 200 Kohm, 10 Turn Trim Potentiometer
C201, C209, C210, C211 — 0.015 μFarad, 50 Volt, 20 percent Capacitors
C202 — 0.01 μFarad, 50 Volt, 20 percent Capacitor
C203, C204 — 0.47 μFarad, 50 Volt, 20 percent Capacitors
C205 — 500 μFarad, 15 Volt, 20 percent Capacitor
C206, C207 — 0.005 μFarad, 50 volt, 20 percent Capacitor
C208 — 0.0068 μFarad, 50 Volt, 20 percent Capacitor
C212, C214, C216 — 1 μFarad, 50 Volt, 20 percent Capacitors
C213, C215, C217 — 0.1 μFarad, 50 Volt, 20 percent Capacitors Use of the present invention in a commutatorless DC motor drive arrangement makes it possible to electronically regulate the speed of the motor. From the equations given above, it may be seen that the frequency of the output of the inverter may be expressed as:

$$f = V_{AV}/6k$$

The essence of the proposed speed regulating scheme is simply to impose an upper limit, corresponding to the desired steady running speed, on the value of $f$. This is done through a closed loop control which adjusts the value of $k$ in such a manner as to keep the frequency constant. The functional block diagram of this speed regulating approach is illustrated in FIG. 12.

Figure 12:
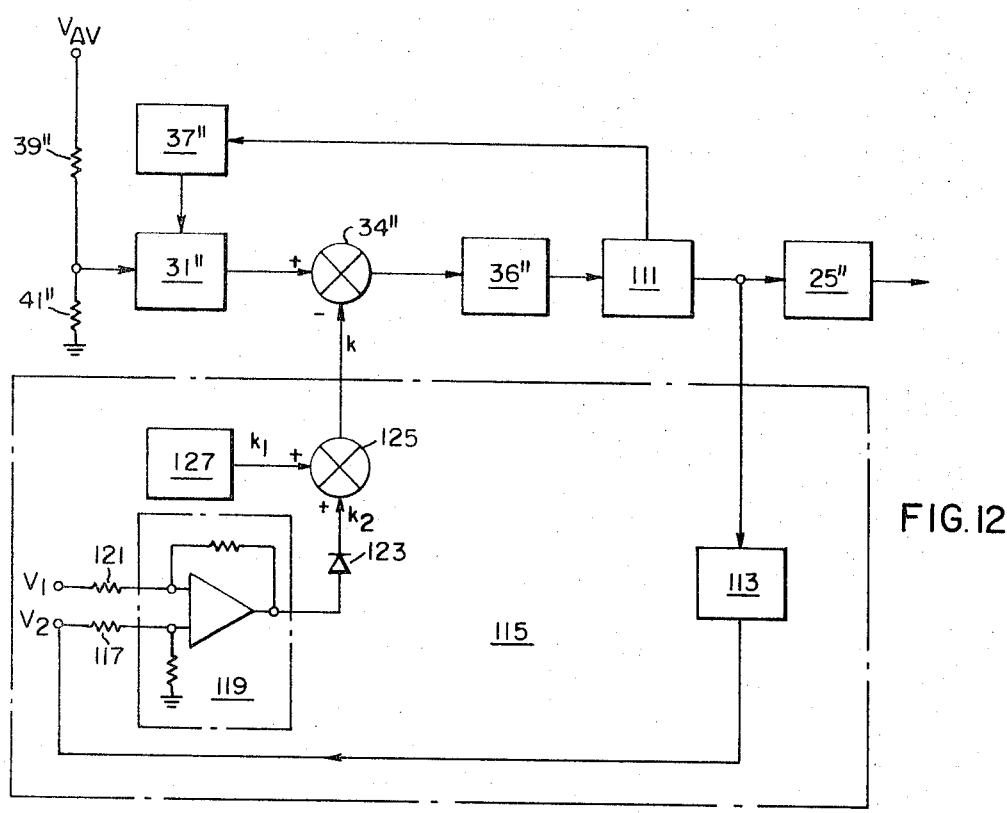
Figure 11:
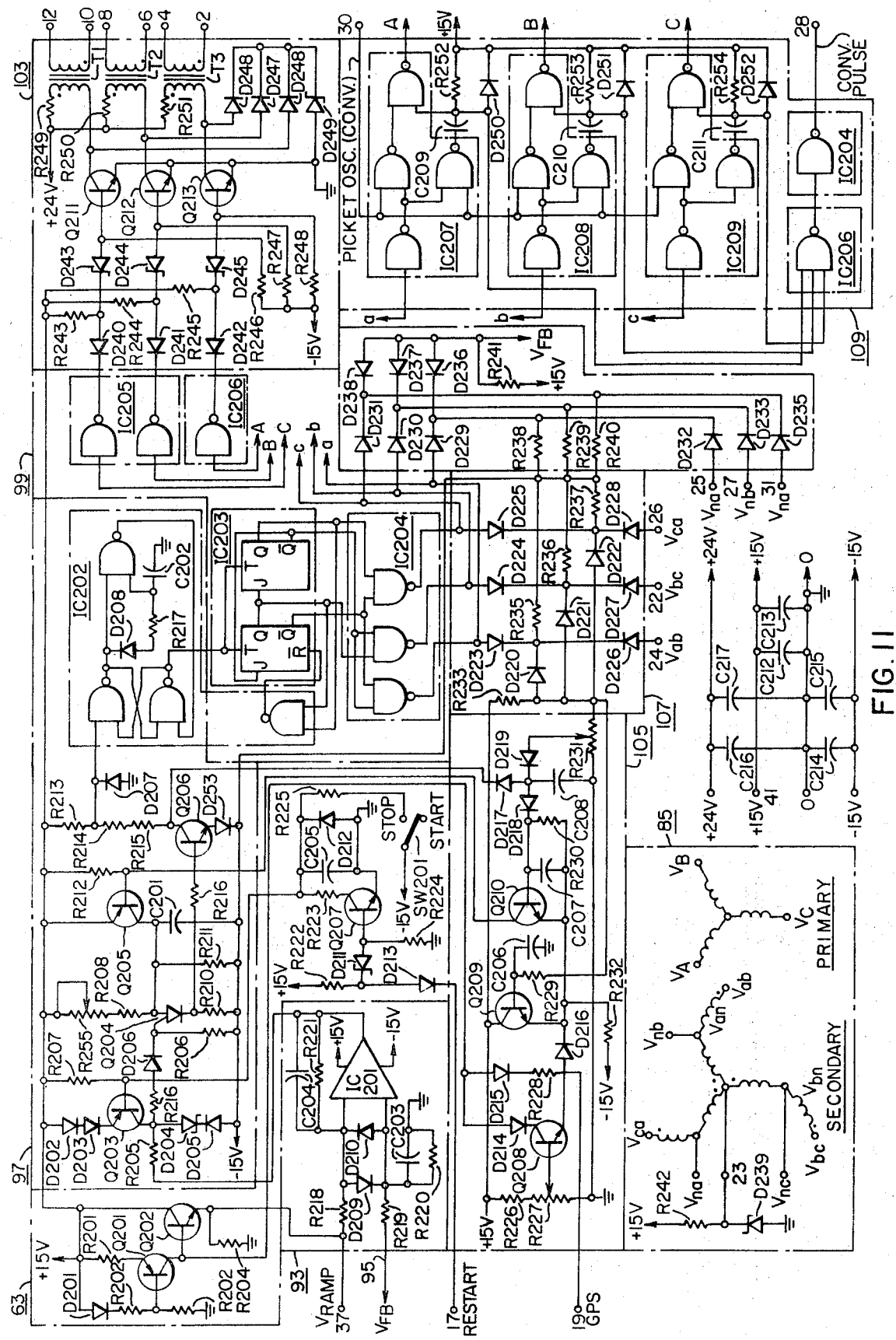
FIG. 11 is a schematic circuit diagram illustrating in greater detail the semiconverter control circuitry of the FIG. 5 arrangement.

For ease of reference, elements of the FIG. 12 circuit that correspond to elements of the FIG. 1 circuit have been identified by the same numeral with a double prime. Thus, it may be seen that pulse shaping circuit 111 that was not illustrated in FIG. 1A shapes the output of crossover detector 36'' before it is applied to firing pulse circuit 25'' and reset circuit 37''. The output of pulse shaper 111 is also applied to an averaging circuit 113 in the speed regulating circuit 115. Averaging circuit 113 produces a DC output voltage $V_2$ which is proportional to the average value of the timing pulses applied to firing pulse circuit 25''. Voltage $V_2$ is passed through a resistor 117 to a differential amplifier circuit 119. Another DC voltage $V_1$ is connected to another input of differential amplifier circuit 119 through a resistor 121. Voltage $V_1$ is a fixed DC voltage representing the desired steady state running speed of the motor. As a result of the action of differential amplifier circuit 119, a reference signal $k_2$ is passed through a diode 123 to a summer circuit 125. Another reference signal $k_1$, which is produced by a reference signal source 127, is also applied to the summer circuit 125. The output of summer 125 is then the reference signal $k$.

It should be noted that since the timing pulses applied to averaging circuit 113 have constant width and amplitude, the voltage $V_2$ is a direct measure of the inverter frequency $f$. Whenever the motor speed is less than the desired running speed (i.e, during acceleration and deceleration), $V_2$ is less than $V_1$, the output of differential amplifier circuit 119 is negative, and $k_2$ equals zero. Thus, under these conditions, the speed regulating circuit 115 has no effect upon the operation of the system and $k$ equals $k_1$. However, whenever the frequency attempts to exceed the set level corresponding to $V_1$, $V_2$ becomes greater than $V_1$, and the output of the differential amplifier circuit 119 tends to go sharply positive. Thus, $k_2$ increases, $k$ increases to $k_1$ plus $k_2$, and the frequency is held substantially to the desired set value. Thus, a closed loop regulation of the frequency is automatically maintained, once the voltage $V_2$ representing the frequency reaches the preset limiting value corresponding to the desired running speed and represented by voltage $V_1$. In practice, the system would be designed so that with $k_2$ equaling zero the desired running speed of the motor is obtained with the input converter fully on, at the lowest 60 Hz input voltage. Increase of the input voltage above the minimum then brings the speed regulating circuit into operation, thereby maintaining the desired set speed as the inverter DC voltage increases.

The relatively complicated speed regulating circuit 115 is necessary, since simply clamping the voltage at the input of integrator 31'' to an appropriate predetermined level is undesirable because of the resultant distortion to voltage waveshape at the input of the integrator. Such wave-shape distortion destroys the detailed instantaneous nature of the information fed back from the inverter and results in an unstable operating mode.

It should be understood that various modifications, changes and variations may be made in the arrangement, operations and details of construction of the elements disclosed herein without departing from the spirit and scope of the present invention.

We claim:

1. A drive arrangement energized by a source of DC power comprising:
   a synchronous AC motor having an armature winding;
   an inverter circuit comprising a plurality of selectively actuatable switching devices, said inverter circuit having a DC side connected to the source of DC power and an AC side connected to said armature winding of said motor to provide electrical energy to said armature winding as determined by selective actuation of said switching devices;

firing pulse means to produce firing pulses to selectively actuate said switching devices;

control means to provide a series of timing pulses to be applied to said firing pulse means to control production of said firing pulses, said control means being responsive to the potential level of the source of DC power to determine the frequency of said timing pulses in such a fashion that the volt-time integral of the DC voltage between successive timing pulses always remains at a predetermined constant value; and regulating means to cause the voltage of the source of DC power to be applied to said inverter circuit with a gradual build-up to full magnitude.

2. A drive arrangement as claimed in claim 1 wherein said control means comprises:

an integrator circuit to integrate the DC voltage that appears across said inverter circuit;

a reference level source to provide a reference level signal; and a comparator circuit to determine when the output of said integrator circuit has a predetermined relationship with respect to said reference level signal and to produce timing pulses indicative thereof.

3. A drive arrangement as claimed in claim 2 and further comprising a reset circuit to cause said integrator circuit to begin another period of integration after the production of a timing pulse.

4. A drive arrangement as claimed in claim 1 and further comprising:

modulating means to superimpose discontinuous pulses at a frequency high with respect to the starting frequency of said inverter circuit on the output of the source of DC power;

current detecting means to determine the current drawn from the source of DC power; and restart means to cause the source of DC power to be removed from and reapplied to said inverter circuit when said current detecting means determines that the current drawn from the source of DC power exceeds a predetermined magnitude prior to the full voltage of the source of DC power being applied to said inverter circuit.

5. A drive arrangement as claimed in claim 1 wherein said motor is a polyphase synchronous motor having a plurality of armature windings.

6. A drive arrangement energized by a source of AC power comprising:

a three-phase synchronous AC motor having a armature winding for each phase;

a semiconverter circuit to produce a controllable magnitude DC voltage from the voltage of the source of AC power;

an inverter circuit comprising a plurality of selectively actuatable switching devices, said switching devices being connected to provide electrical energy to said armature windings of said motor as determined by selective actuation of said switching devices;

an inductor connected between said semiconverter circuit and said inverter circuit;

firing pulse means to produce firing pulses to selectively actuate said switching devices;

an integrator circuit to integrate the DC voltage applied to said inverter circuit through said inductor;

an integrator reference source to provide an integrator reference level signal;

an integrator comparator circuit to determine when the output of said integrator circuit has a predetermined relationship with respect to said integrator reference level signal and to produce timing pulses indicative thereof, said timing pulses being applied to said firing pulse means to cause production of said firing pulses;

a reset circuit to cause said integrator circuit to begin integrating anew upon production off each timing pulse;

regulating means to cause said semiconverter to produce a DC voltage that gradually increases to full magnitude;

current detecting means to determine the current drawn from said semiconverter; and restart means responsive to the output of said current detecting means to cause said controllable DC voltage of said semiconverter circuit to be returned to its starting value and to recommence its gradual increase in magnitude when the current drawn from said semiconverter exceeds a predetermined magnitude during start-up of said motor.

7. A drive arrangement as claimed in claim 6 and further comprising wave-shaping means to fill in discontinuities in the voltage applied to said inverter circuit during start-up.

8. A drive arrangement as claimed in claim 7 wherein:

said selectively actuable switching devices are six thyristors divided into three pairs, each pair of thyristors being connected in series with said controllable DC voltage applied thereacross; and each of said armature windings is connected to the midpoint of a separate one of said pairs of thyristors.

9. A drive arrangement as claimed in claim 8 wherein said wave-shaping means comprises:

three pairs of diodes, the midpoint of each of said pairs of diodes being connected to the midpoint of a corresponding one of said pairs of thyristors;

a first resistor connecting one end of each of said pairs of diodes to one of the DC terminals of said inverter circuit; and a second resistor connecting the other end of each of said pairs of diodes to the other DC terminal of said inverter circuit.

10. A drive arrangement as claimed in claim 6 wherein said restart means comprises:

an abnormal start reference source to provide an abnormal start current level reference signal; and an abnormal start comparator circuit to reset said regulating means when the output of said current detecting means exceeds said abnormal start current level reference signal.

11. A drive arrangement as claimed in claim 10 wherein said regulating means comprises a ramp signal generator that may be reset to recommence production of the ramp signal upon receipt of a signal from said abnormal start comparator circuit.

12. A drive arrangement as claimed in claim 11 wherein said restart means further comprises:

a window reference source to provide a window reference signal representative of the ramp signal level above which a detected current of the magnitude of said abnormal start current level reference signal no longer represents an abnormal start;

a ramp comparator to produce a window signal output only when the ramp signal is less than said window reference signal; and reset means to reset said ramp signal generator only when signals are produced by both said abnormal start comparator and said ramp comparator.

13. A high-speed drive arrangement for a centrifugal compressor in an air conditioning system, energized by a source of AC power, comprising:

a three-phase synchronous AC compressor motor having an armature winding for each phase;

a semiconverter circuit to produce a controllable magnitude DC voltage for the voltage of the source of AC power;

an inverter circuit comprising three pairs of thyristors, each pair of thyristors being connected in series with said controllable DC voltage applied thereacross, each of said armature windings of said motor having one end thereof connected to the midpoint of a respective one of said pairs of thyristors, the other ends of said armature windings being connected in common;

a smoothing inductor located in one line between said semiconverter and said inverter;

firing pulse means to produce firing pulses to selectively actuate said thyristors;

an integrator circuit to integrate the DC voltage applied to said inverter circuit through said inductor;

an integrator reference source to provide an integrator reference level signal representative of a predetermined volt-time integral value;

an integrator comparator circuit to determine when the output of said integrator circuit has a value equal to that of said integrator reference level signal and to produce timing pulses indicative thereof, said timing pulses being applied to said firing pulse means to cause production of said firing pulses at a frequency dependent upon the amplitude of said controllable DC voltage;

a reset circuit to cause said integrator circuit to start a new cycle of operation upon production of each timing pulse;

wave-shaping means comprising three pairs of diodes, each pair of diodes connected in series with suitable resistances between the two sides of the DC voltage applied to said converter circuit, the midpoint of each pair of diodes connected to the midpoint of a corresponding pair of thyristors;

a ramp signal generator producing a ramp signal that is utilized to control said semiconverter to produce a DC voltage to be applied to said inverter circuit that gradually increases to full magnitude, said ramp signal generator being capable of being reset to recommence production of said ramp signal;

current detecting means to determine the current drawn from said semiconverter;

an abnormal start reference source to provide an abnormal start current level reference signal;

an abnormal start comparator circuit to reset said ramp signal generator when the output of said current detecting means exceeds said abnormal start current level reference signal;

a window reference source to provide a window reference signal representative of the level of said ramp signal above which a current drawn from said semiconverter of the magnitude of said abnormal start current level reference signal no longer represents an abnormal start;

a ramp comparator to produce a window signal output only when said ramp signal is less than said window reference signal; and reset means to reset said ramp signal generator only when signals are produced by both said abnormal start comparator and said ramp comparator.

* * * * *